No. 712,086. Patented Oct. 28, 1902.
F. M. OEDER.
MACHINE FOR HARVESTING BEETS.
(Application filed Dec. 27, 1901.)
(No Model.)
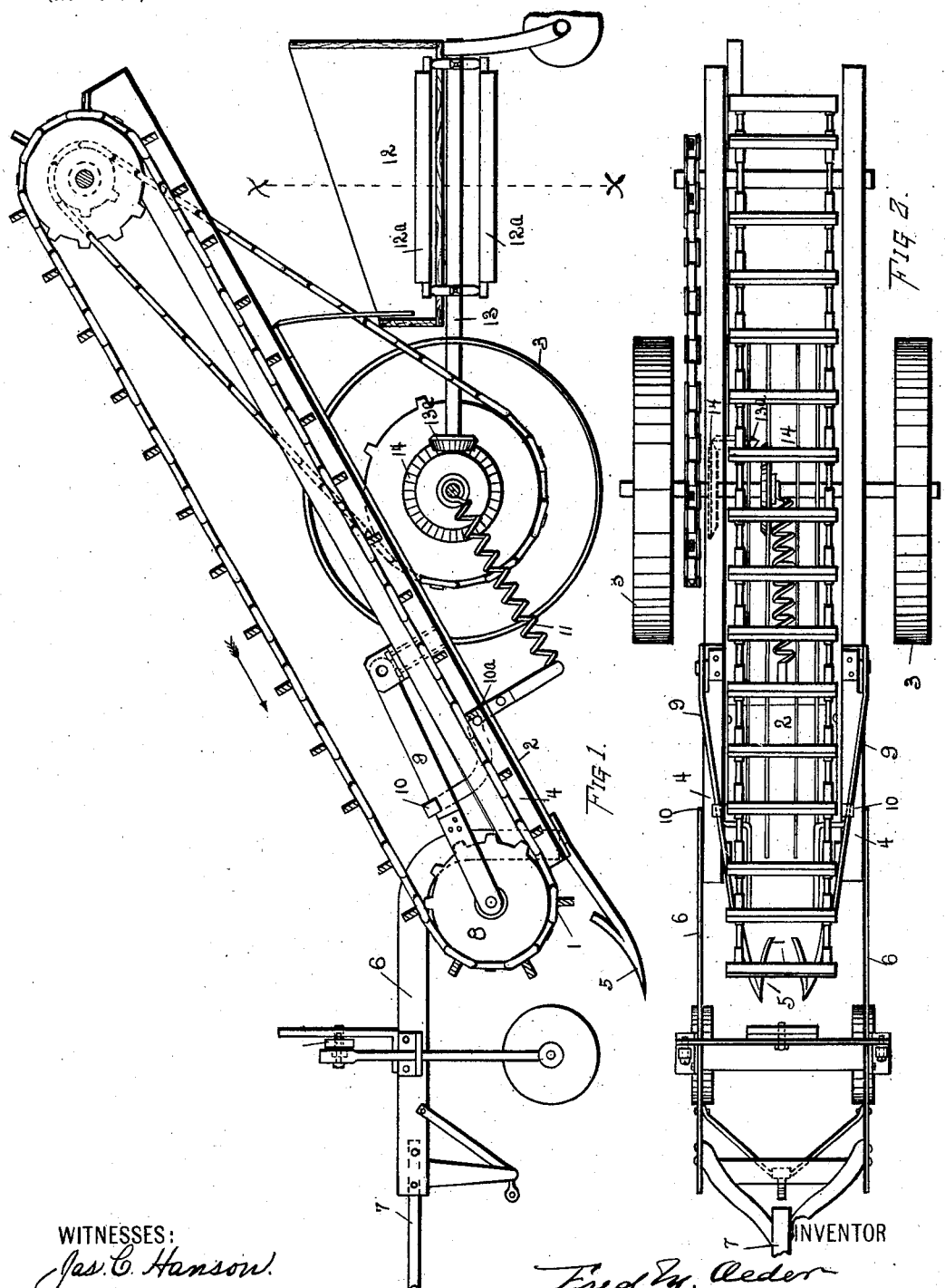
WITNESSES:
Jas. C. Hanson.
William Stephens.
INVENTOR
Fred M. Oeder
BY
Geo. B. Willcox ATTORNEY

UNITED STATES PATENT OFFICE.

FRED M. OEDER, OF BANGOR TOWNSHIP, MICHIGAN.

MACHINE FOR HARVESTING BEETS.

SPECIFICATION forming part of Letters Patent No. 712,086, dated October 28, 1902.

Application filed December 27, 1901. Serial No. 87,455. (No model.)

*To all whom it may concern:*

Be it known that I, FRED M. OEDER, a citizen of the United States, residing in Bangor township, in the county of Bay and State of Michigan, have invented certain new and useful Improvements in Machines for Harvesting Beets; and I do hereby declare the following to be a full, clear, and exact description of the invention, such as will enable others skilled in the art to which it appertains to make and use the same.

This invention is a machine for harvesting sugar-beets and other vegetables; and the improvement consists in certain means and devices whereby the objects of my invention are accomplished. These objects are, first, to provide a digging device that will remove the beets from the ground without injuring them and to provide a conveyer that will yieldingly seize the beets and elevate them to a point from which they are dropped into a receptacle.

Another object is to provide means for automatically discharging the beets from the receptacle in windrows.

With these objects in view the machine consists in the devices illustrated in the accompanying drawings, in which—

Figure 1 is a longitudinal section of the machine. Fig. 2 is a top view.

As is clearly shown in the drawings, the device consists in an inclined conveyer 1, the lower flight of which travels above an inclined bottom 2, carried by wheels 3, by which the driving power is imparted to the conveyer. The lower end of the frame 4, which carries the bottom 2, also carries at its lower end the digging-points 5, by which the beets are loosened from the soil. Forwardly-extending bars 6 are fastened at one end to the frame 4 and are secured at their front ends to the guiding pole or tongue 7.

As the machine is drawn forward over the field the shoes 5 dig the beets from the ground, and they are immediately seized by the upwardly-moving flights of the conveyer 1 and are pushed up the inclined slatted bottom 2, the loose earth dropping through. In order to prevent the beets from being injured by the conveyer-flights, the lower sprockets 8 are yieldingly mounted by means of a bar 9, pivoted at its rear end to the frame 4, so that the lower end of the conveyer can rise and fall relatively to the bottom 2. In order to produce uniform downward pressure of the conveyer-buckets, I provide a presser-bar 10, mounted on the frame 4 by means of a pivot 10ª. The lower end of the presser-bar is drawn back by means of a spring 11, secured to the axle or frame of the machine. The tension of the spring acting through the bar 10 yieldingly presses the lower end of the conveyer downward and prevents bruising the beets.

The beets are carried up to the end of the bottom 2 and are dropped into a box or receptacle 12 below. The box 12 is mounted on wheels and has free vertical movement to override obstructions. A conveyer having transversely-moving scrapers 12ª is mounted in the bottom of the box 12, and by means of this conveyer the beets are pushed out. The conveyer is driven by a shaft 13, carrying a bevel-pinion 13ª, which can be thrown into or out of gear with either of two bevel-pinions 14, secured to the shafts of the wheels 3. By shifting the pinion 13ª from one to the other of the pinions 14 the motion of the conveyer 12ª can be reversed, and the beets can be discharged on either side of the box 12 as desired.

What I claim as my invention, and desire to secure by Letters Patent, is—

In a harvesting-machine of the class described, an inclined bottom, a conveyer comprising an upper and lower flight, the lower flight being arranged to travel up the upper surface of the inclined bottom; a pair of sprocket-wheels for carrying the lower end of said conveyer; vertically-movable arms carrying said sprocket-wheels at their lower ends, said arms being pivoted at their upper ends to the frame of the machine; together with a lever and spring operating to press the arms downwardly, substantially as described.

In testimony whereof I affix my signature in presence of two witnesses.

FRED M. OEDER.

Witnesses:
 I. GOULD,
 JAMES C. HANSON.